US007770715B2

(12) United States Patent
Burckhardt

(10) Patent No.: US 7,770,715 B2
(45) Date of Patent: Aug. 10, 2010

(54) SCREEN CONVEYOR FOR PANEL-PRESSING SYSTEM

(75) Inventor: Ralf Burckhardt, Krefeld (DE)

(73) Assignee: Siempelkamp Maschinen-und Anlagenbau GmbH & Co. KG, Krefeld (DE)

( * ) Notice: Subject to any disclaimer, the term of this patent is extended or adjusted under 35 U.S.C. 154(b) by 377 days.

(21) Appl. No.: 11/196,779

(22) Filed: Aug. 3, 2005

(65) Prior Publication Data

US 2006/0027302 A1 Feb. 9, 2006

(30) Foreign Application Priority Data

Aug. 5, 2004 (DE) ....................... 10 2004 038 055

(51) Int. Cl.
*B65G 37/00* (2006.01)
*B65G 15/22* (2006.01)

(52) U.S. Cl. .................... 198/626.1; 156/62.2; 156/557

(58) Field of Classification Search ............. 198/626.1; 156/62.2, 557

See application file for complete search history.

(56) References Cited

U.S. PATENT DOCUMENTS 3,542,629 A 11/1970 Burkner ...................... 156/558
3,700,366 A * 10/1972 Piacente ...................... 425/71
4,099,434 A * 7/1978 Hardouin ...................... 83/157
4,349,101 A * 9/1982 Eldred et al. ................ 198/851
4,850,846 A * 7/1989 Walter ........................ 425/337
5,141,098 A * 8/1992 Schmale .................. 198/468.6

FOREIGN PATENT DOCUMENTS

DE 101 22 969 11/2002
DE 101 22 970 11/2002

OTHER PUBLICATIONS

"Modern Particleboard & Dry-Process Fiberboard Manufacturing" T. Maloney (1977: Miller Freeman Publ. Inc) p. 459-477.

* cited by examiner

*Primary Examiner*—Gene Crawford
*Assistant Examiner*—Kavel P Singh
(74) *Attorney, Agent, or Firm*—Andrew Wilford

(57) ABSTRACT

A conveyor displaces a succession of identical screens along a closed annular path having a generally horizontal upper stretch and a lower return stretch spaced below the upper stretch. Particle mats are formed on the screens on the upper stretch. A press along the upper stretch downstream of the mat-former compresses the mats into rigid panels. A screen changer includes a unit for removing a bad screen from the conveyor and a unit for feeding a fresh screen to the conveyor and thereby replacing the bad screen with the fresh screen. One of the units is generally entirely within the path, below the upper stretch and above the lower stretch.

18 Claims, 11 Drawing Sheets

SCREEN CONVEYOR FOR PANEL-PRESSING SYSTEM

FIELD OF THE INVENTION

The present invention relates to a system for making wood panels, e.g. of chips or fibers. More particularly this invention concerns a conveyor system for circulating screens holding the fibers or chips through the press of such a system.

BACKGROUND OF THE INVENTION

A standard system for making fiber- or chip-board, e.g. OSB or MSB panels, has as described in German patent documents 102 22 969 and 102 22 970 of R. Burckhardt a multistory press that is loaded by a conveyor system with a stack of screens on which have been formed respective uniform but loose mats of the material that is to be pressed into a panel by the press. This material is normally wood chips and/or fibers mixed with an appropriate heat-setting binder, e.g. a phenolic resin, so that, when the mat is pressed and heated, a rigid panel suitable for structural use is formed.

The fiber or chip mats are formed on screens each normally constituted as a flexible but strong rectangular mesh panel having a stiffening bar along leading and trailing edges. The conveyor normally has a pair of endless belts or chains that are spaced horizontally from each other and that are each provided with a succession of grabs or hooks adapted to hold ends of the stiffening bars, operating so as to hold the screens so they are taut and planar. The endless conveyor chains have a generally horizontal upper stretch extending in a horizontal transport direction from a mat forming station at an upstream end, through a press loader, then through the press, then through a press unloader to a downstream end. From the downstream end the conveyor has a return stretch that passes back in an upwardly concave arcuate path in a return direction opposite the transport direction underneath the press to the upstream end. The press stands on the floor and a well or pit is formed underneath it for the return stretch.

Thus a mat is formed on each of the screens as it passes underneath the mat former at the upstream end of the transport stretch. The screens are then separated from the conveyor at the press loader and put in a rack upstream of the multistory press. Periodically the screens in the loader rack are moved as a batch into the multistory press for compression into finished panels, although the system can operated with a simple single-story press. The finished panels and their screens are moved as a batch out to the unloader and refitted to the conveyor for movement away from the press. Finally the panels are stripped off the screens and the empty screens are recirculated back underneath the press to the upstream end to restart the cycle.

Such a system is extremely effective in that it can convert bulk material—wood chips or fibers or plastic particles—into rigid panels at a very high production rate. The conveyor runs continuously, with the batch operation of the press being accommodated by the press loader and unloader, for a very high production rate.

A problem with such an operation is that the screens are subject to considerable wear and must be replaced if they become damaged, since they will leak particles so as to produce a bad finished product and foul the equipment. Accordingly, above-cited German '969 provides near the downstream end of the press along the return stretch of the conveyor a system for removing damaged screens and replacing them with good ones. The problem with such an arrangement is that it requires that the well under the press through which the conveyor returns be substantially enlarged to accommodate the screen-changing unit, as the screens measure several meters in length and width, e.g. 14 m long, and can weigh as much as 350 kg, although they can be rolled up when not being used. Hence these systems add considerably to the installation costs for a panel-making system.

OBJECTS OF THE INVENTION

It is therefore an object of the present invention to provide an improved screen conveyor for a panel-pressing system.

Another object is the provision of such an improved screen conveyor for panel-pressing system that overcomes the above-given disadvantages, in particular that allows the screens to be switched by a unit that does not significantly increase the size of the pressing system.

SUMMARY OF THE INVENTION

A conveyor displaces a succession of identical screens along a closed annular path having a generally horizontal upper stretch and a lower return stretch spaced below the upper stretch. Particle mats are formed on the screens on the upper stretch. A press along the upper stretch downstream of the mat-former compresses the mats into rigid panels. A screen changer includes a unit for removing a bad screen from the conveyor and a unit for feeding a fresh screen to the conveyor and thereby replacing the bad screen with the fresh screen. One of the units is generally entirely within the path, below the upper stretch and above the lower stretch.

By putting at least part of the screen-changing apparatus inside the conveyor, this system does not add to the overall size of the panel-making equipment. The standard pit or well underneath the press through which the screens are returned to the upstream end of the installation does not have to be enlarged, making it possible to install the screen-changing system of this invention in an existing apparatus.

Normally special conveyors are provided at the upstream end of the conveyor, that is at the downstream end of the return stretch and the upstream end of the upper stretch, the one handing the screens off to the other. The mat former is normally associated with the upstream-end conveyor of the upstream stretch to which the screens are transferred from the downstream end of the return stretch. According to one embodiment of the invention both of the units are located within the path along the lower return stretch near an upstream end of the upper stretch. The furthest downstream conveyor of the return stretch is angled upward and has a pair of horizontally spaced conveyor elements carrying grabs engageable with the screens. The removing unit pulling the bad screen off the conveyor upstream of the angled conveyor and the feeding unit feeds the fresh screen to the angled conveyor. Otherwise the conveyor in the return stretch can be a simple set of belts and/or chains on which the returning screens lie.

In another embodiment of the invention downstream of the press is a device for stripping the panels from the respective screens. The changer is juxtaposed with the stripper. Here the removing unit is located inside the path. The feeding unit can be a tiltable table outside the path, downstream of the press.

According to the invention both the units are inside the path. The changer includes a single conveyor that simultaneously pulls the bad screen from the conveyor and feeds the fresh screen to it. This single conveyor has a pair of flexible endless conveyor elements each provided with a succession of grabs engageable with the screens, so that it can simultaneously and synchronously pull a bad screen out of the conveyor path while feeding a fresh screen into the path. It also has a horizontal stretch, although it can include an end section extending at an angle to the horizontal stretch from the horizontal stretch to the return stretch of the conveyor. This conveyor has an upper stretch and a table immediately underneath it and a lower stretch and a guide immediately underneath it. It is at least as long as one of the screens so that the screen being removed lies flatly on it for cleaning or inspection, and the fresh screen can also be laid out flat before being fed into the conveyor. The screens are normally between 10 m and 20 m long, in particular between 12 m and 16 m. A single direct-current drive motor, e.g. having an 8 to 10 kW rating—preferably 9 kW—can drive this removing/feeding conveyor.

In the system where feeding unit is outside the path and the removing units is inside the path, the feeding unit is upstream of the removing unit. Here again the removing unit includes a pair of endless conveyor elements provided with grabs engageable with the screens.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
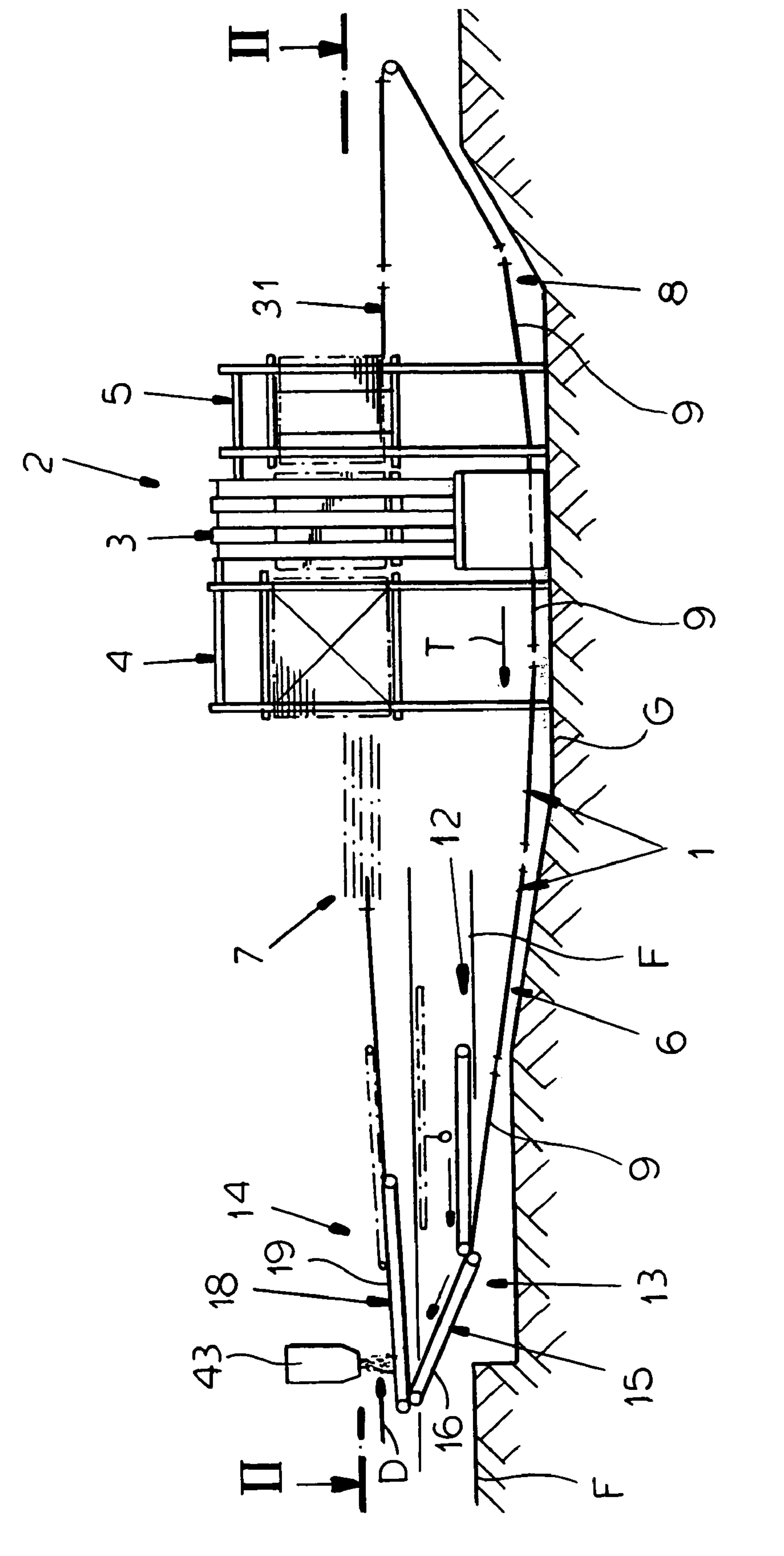
FIG. 1 is a schematic side view of a pressing system according to the invention.
Figure 2:
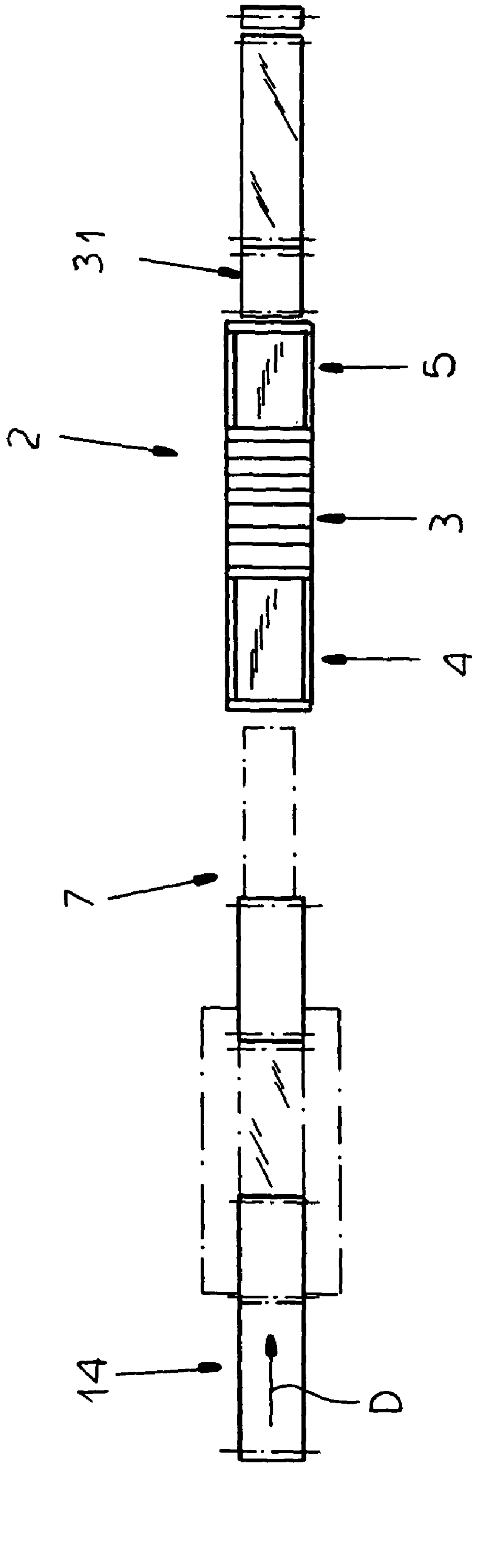
FIG. 2 is a top view taken along section line II-II of FIG. 1.

As seen in FIGS. 1 and 2 an apparatus for making panels circulates a succession of like screens 1 in a straight-line horizontal transport direction D through a pressing unit 2 having a multistory or multiplaten press 3 with an upstream rack-type loader 4 and a downstream unloader 5. A conveyor 6 circulates the screens 1 in the transport direction D in a horizontal transport stretch 7 above a floor level F from a mat former 43 that deposits particles on the screens 1 then through the press unit 2 to a panel stripper 31, and then circulates the empty screens 1 back in an opposite return direction T in a return stretch 8 in a pit G below the floor level F and underneath the upper stretch 7. The conveyor 6 is formed in the return stretch 8 by several conveyor belts 9. Thus the screens 1 follow one another in a row through an annular and continuous path.

Figure 3:
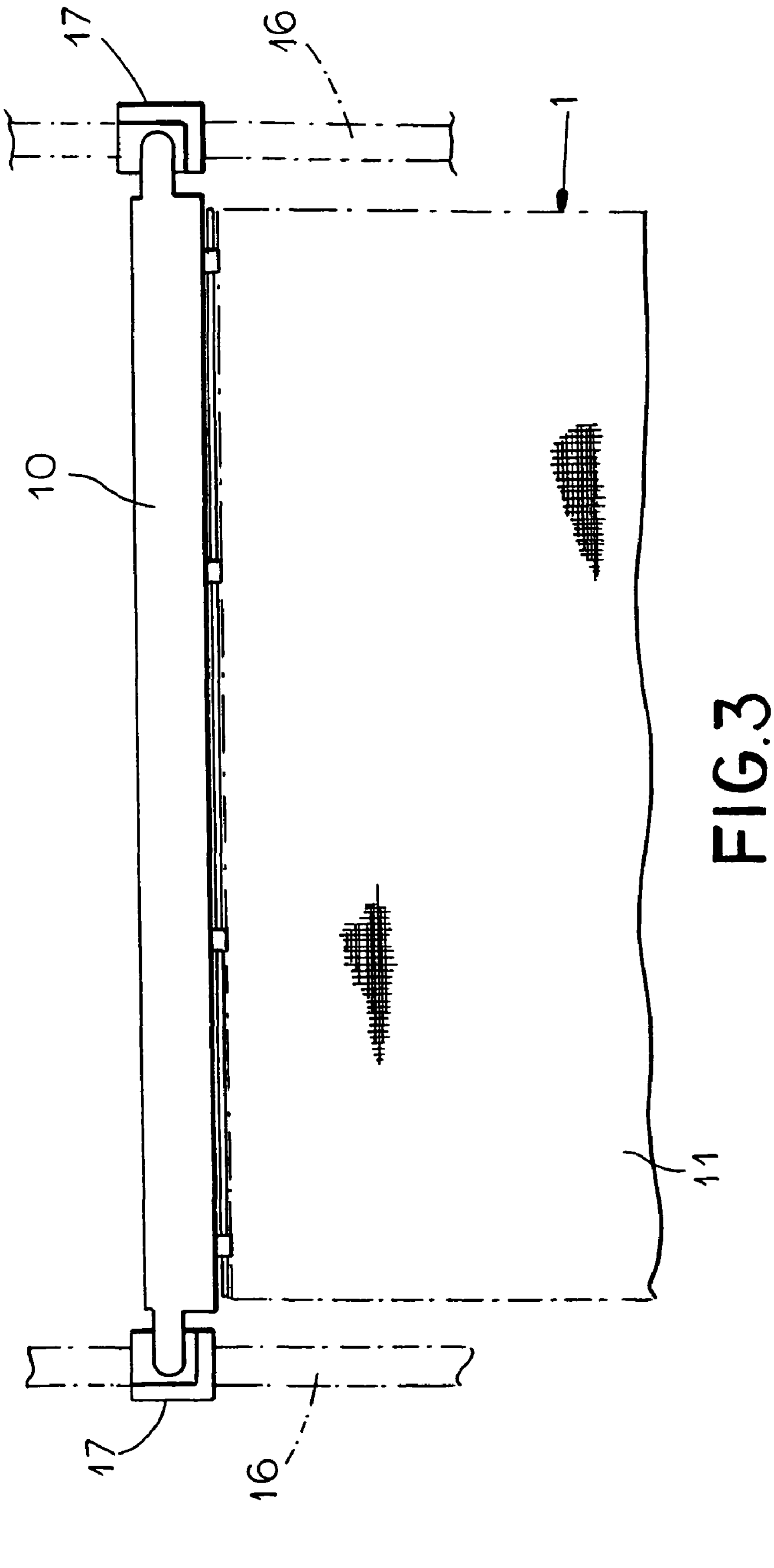
FIG. 3 is a large-scale top view of a detail of FIG. 2.
Figure 4:
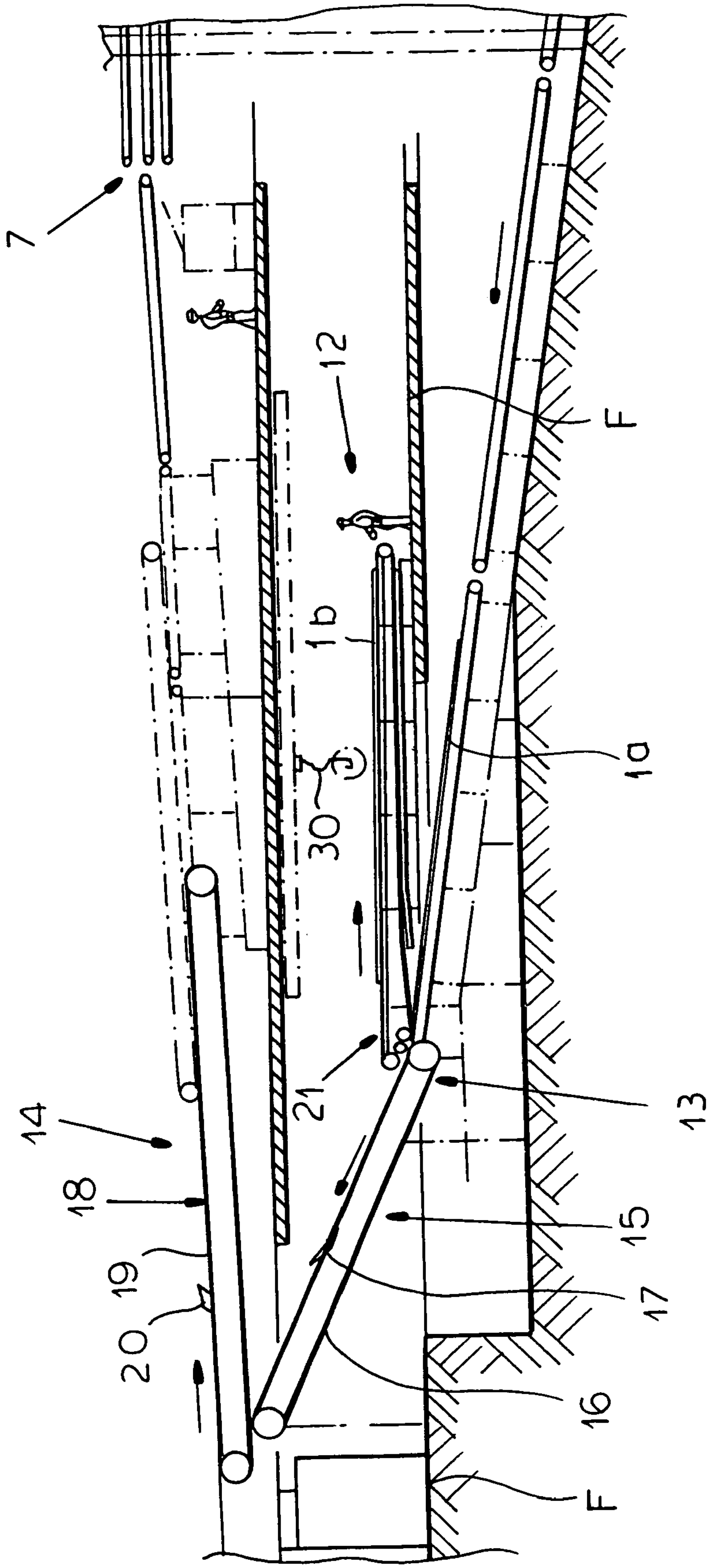
FIG. 4 is a large-scale view of a detail of FIG. 1.
Figure 5:
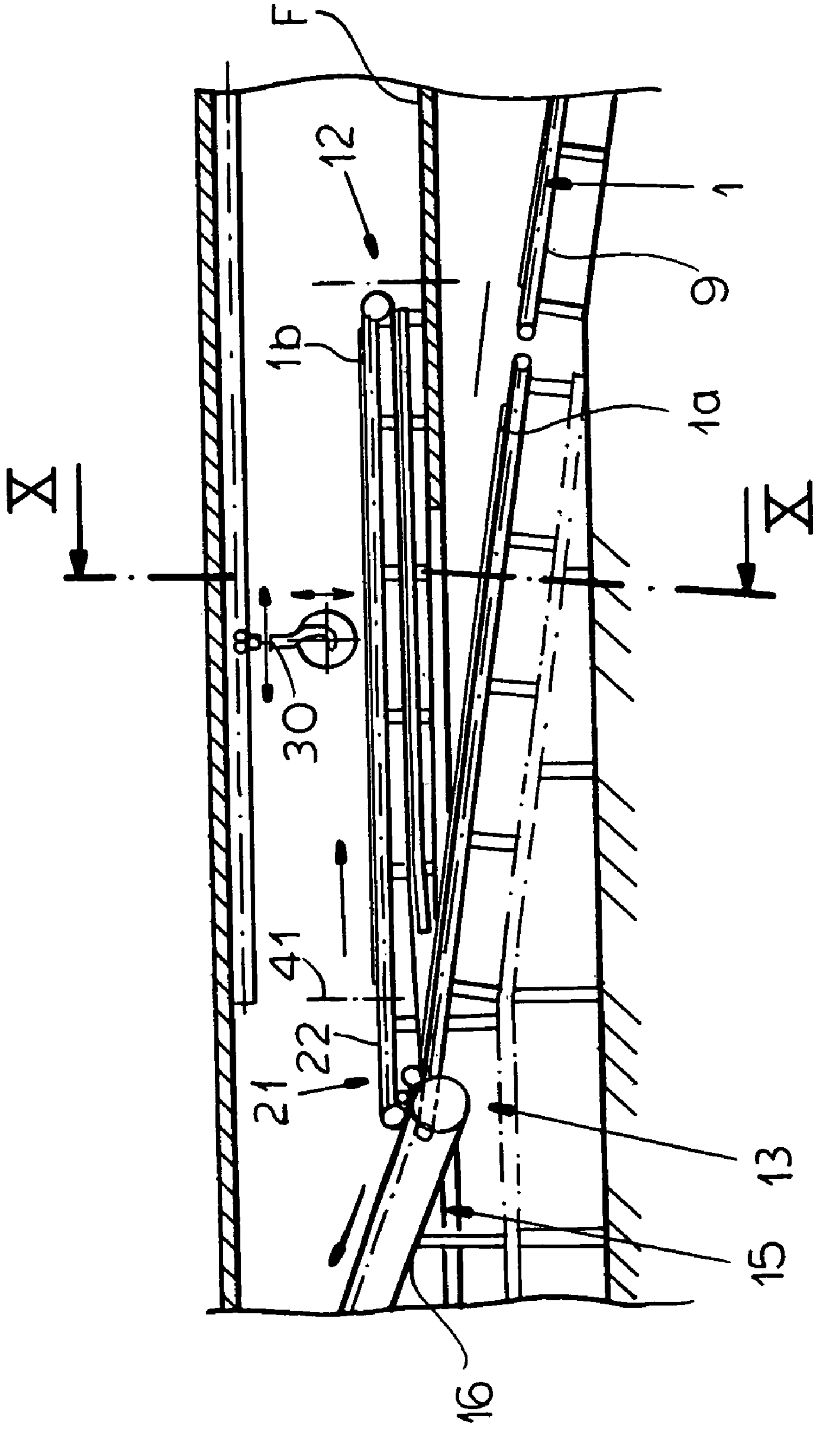
FIG. 5 is a view of detail of FIG. 4.

Each screen 1 is comprised as shown in FIG. 3 by a pair of horizontally extending and rigid stiffening bars 10 between which is secured a flexible mesh 11. At least at an upstream end of the stretch 7, the conveyor 6 has side elements 16, e.g. chains or belts, equipped with grabs 17 engageable with ends of the bars 10 to positively advance the screens 1, normally such that the meshes 11 are taut, horizontal, and planar as they move toward the press unit 2. This is all generally standard.

According to the invention the system has a screen changer 12 serving to pull a damaged screen 1*a* out of circulation and replace it with a fresh or good screen 1*b*. This changer 12 is located in the embodiment of FIGS. 1 to 10 wholly inside the annular path defined by the upper and lower stretches 7 and 8 of the conveyor 6 so that it adds nothing to the size of the system.

More particularly, as shown in FIGS. 4 through 10, the changer 12 lies wholly above the floor F and at a junction 13 between one of the lower-stretch belts 9 and a conveyor system 14 comprising a conveyor 15 that forms relative to the transport directions D and R the downstream end of the lower stretch 8 and a conveyor 18 forming the upstream end of the upper stretch 7. These conveyors 15 and 18 have chains 16 and 19 with grabs 18 and 20 for the ends of the bars 10 of the screens 1, so that the screens 1 can be handed off from the one to the other in accurately controlled positions. The conveyor 18 runs oppositely to the conveyor 15.

The screen changer 12 has a generally horizontal chain-type conveyor 21 having chains 22 provided with grabs 23, spanned between horizontally spaced drums 24 and 25, and positioned generally at the floor level F so as to have an upper stretch 26 and a lower stretch 27. Underneath the upper stretch 26 is a support table 28. Similarly, there is a screen guide frame 29 underneath the lower stretch 27. Both the table 28 and guide 29 are horizontal and the conveyor 21 is somewhat longer than a length S of one of the screens 1, 1*a*, or 1*b*, here by between about 10% and 50%, preferably between about 10% and 30%.

Figure 6:
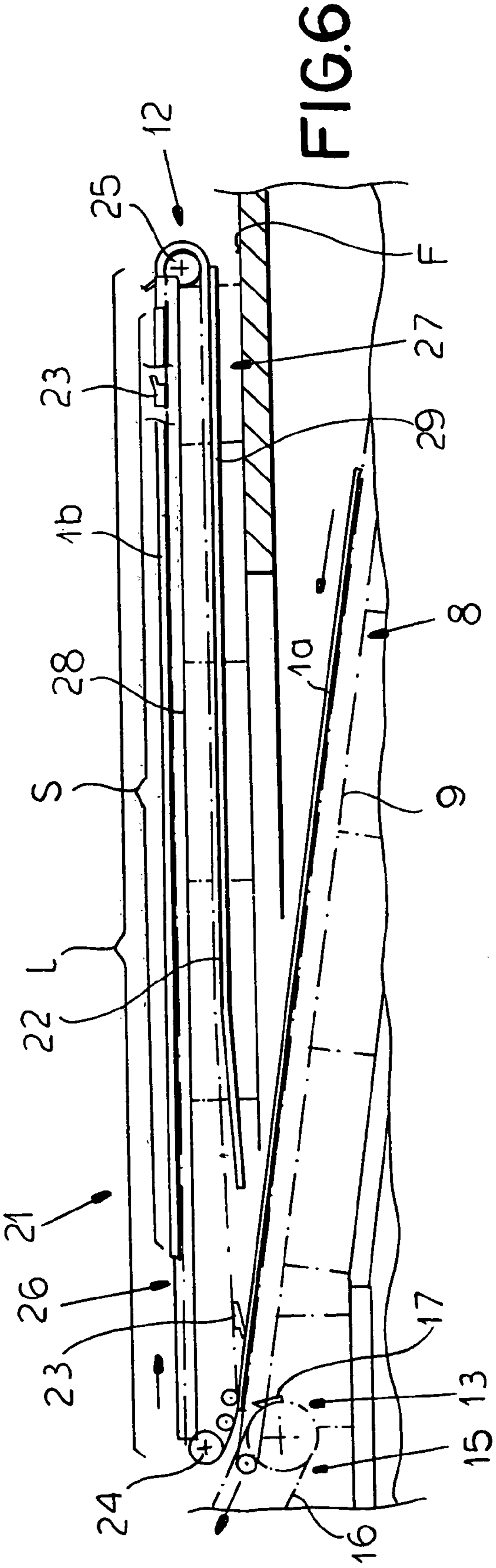
FIGS. 6 through 9 are views like FIG. 5 showing the screen changer in successive operational positions.

The above-described screen changer 12 functions as follows:

To start with a good screen 1*b*, which is several meters long and several meters wide, is laid out flat on the upper table 28 and the grabs 23 are positioned offset from it as shown in FIG. 6. Meanwhile a damaged screen 1*a* will arrive in direction T on the lower stretch 8.

Figure 7:
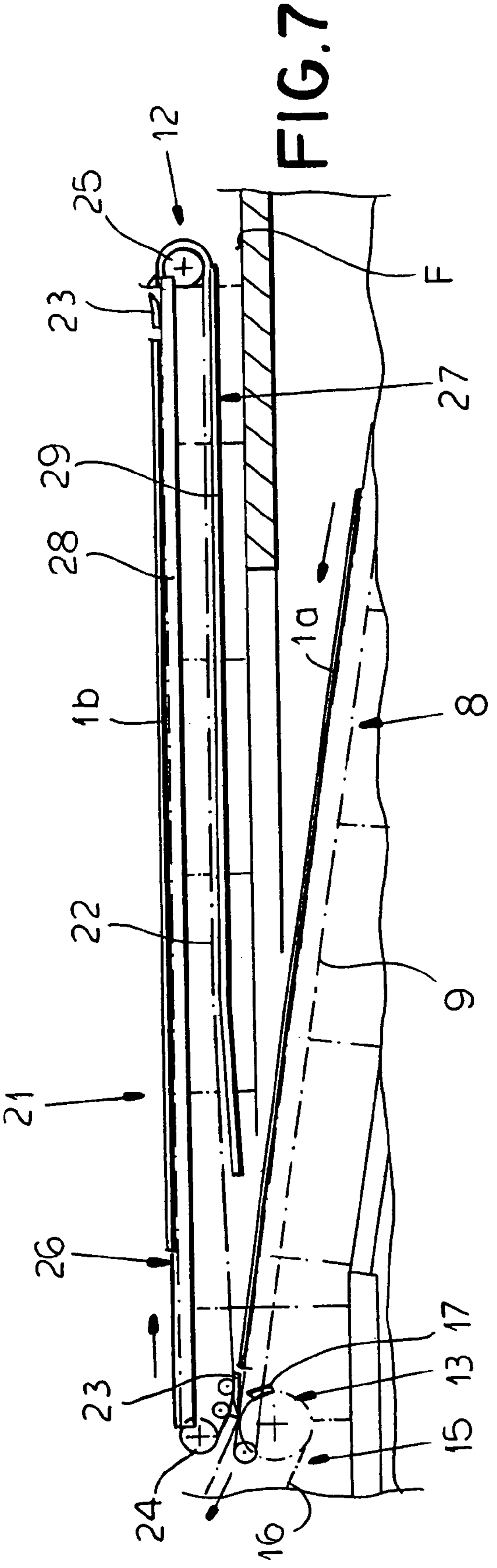
Figure 8:
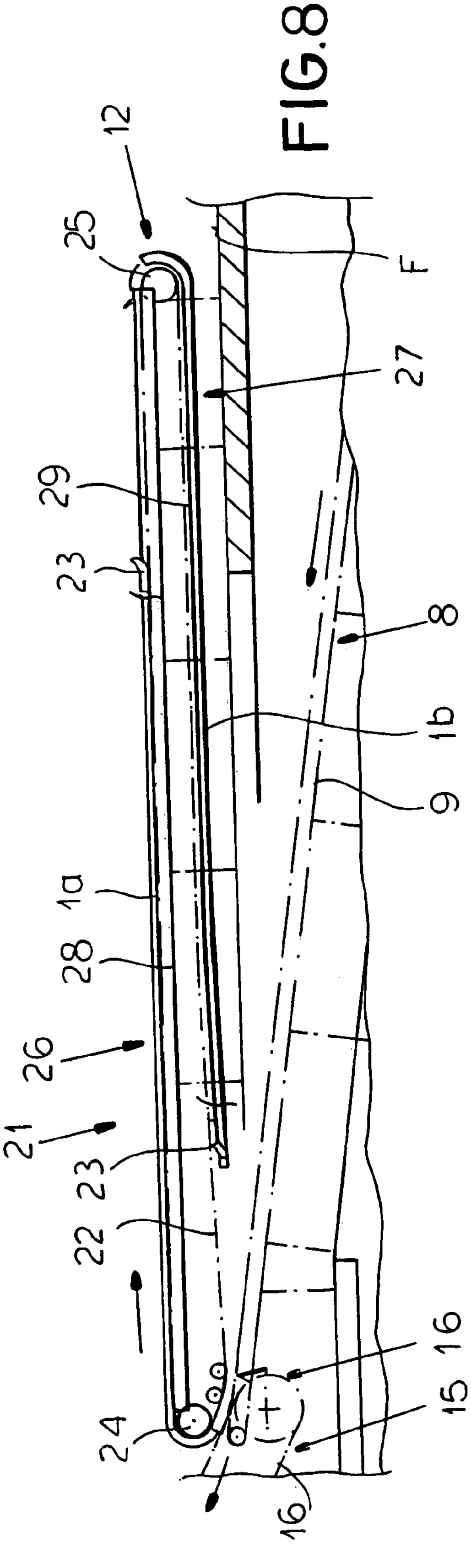
Figure 9:
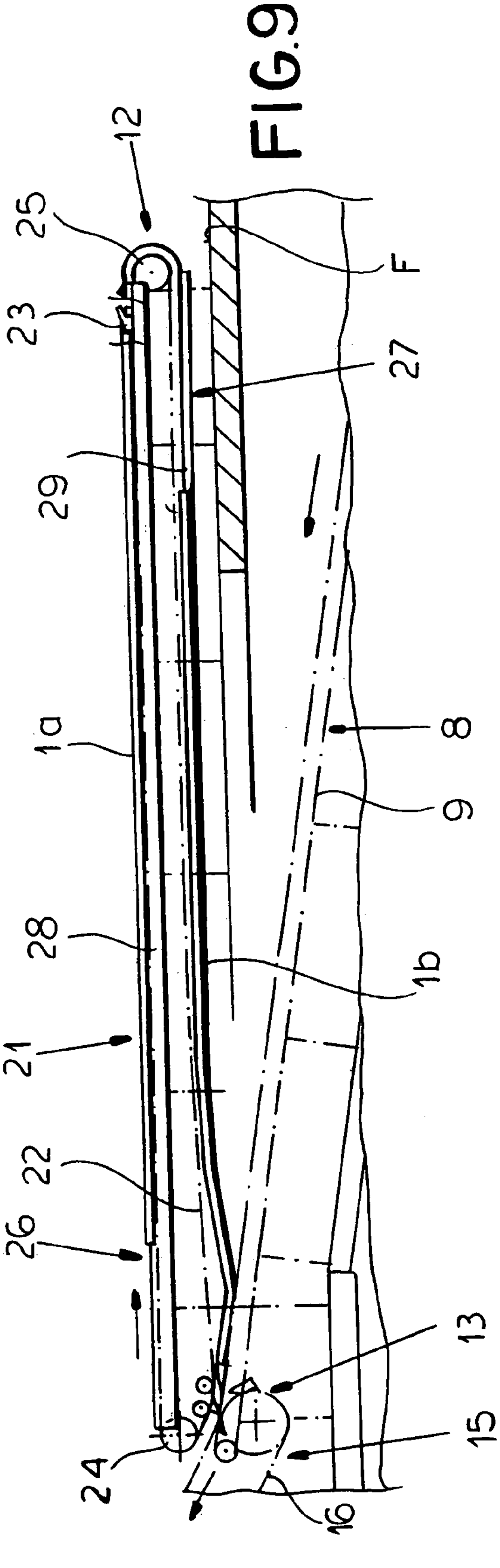
Figure 10:
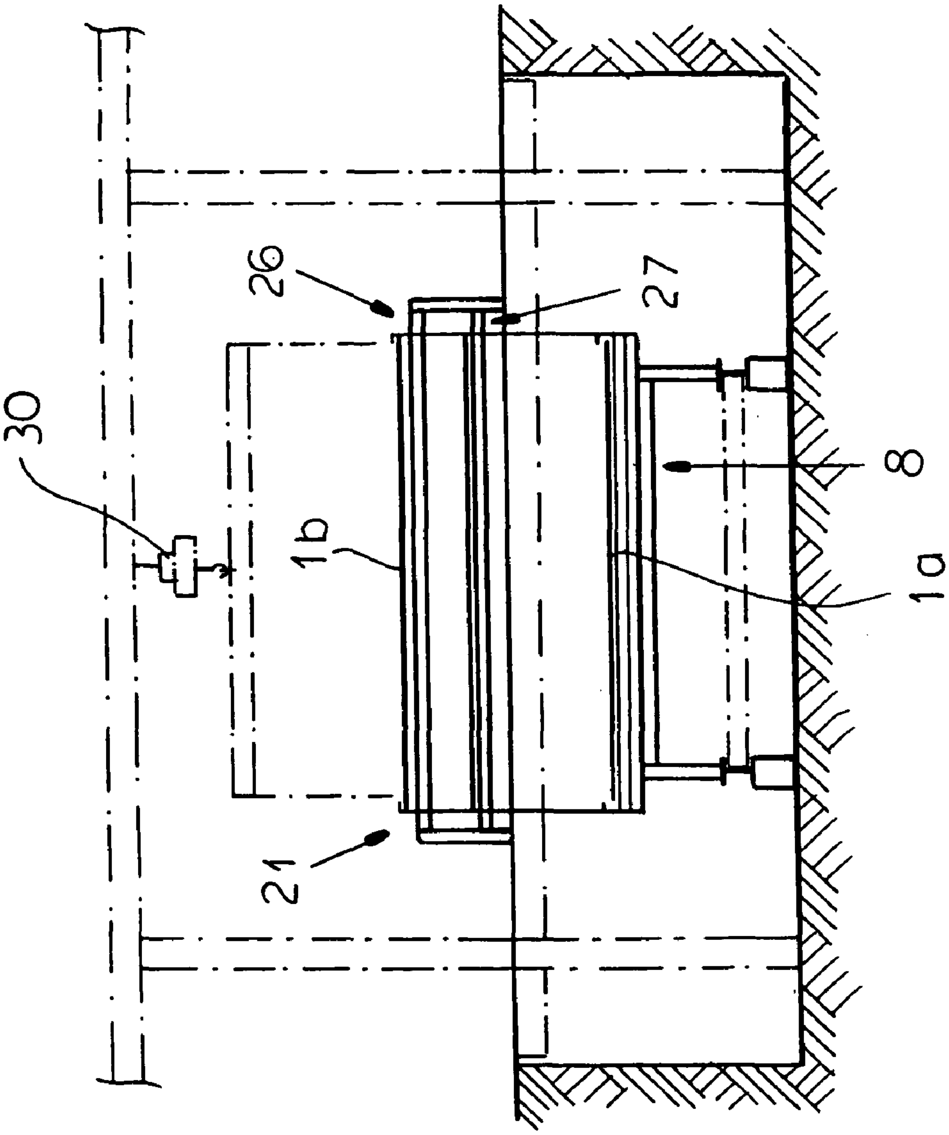
FIG. 10 is a cross section taken along line X-x of FIG. 5.

The grabs 17 of the conveyor 15 are similarly set as shown in FIG. 6 in a starting position outside the path of the screens 1. If the arriving screen 1 is not to be changed, the grabs 17 engage its leading bar 10 and move it along to the conveyor 18 and the screen changer 12 does nothing. If, however, the screen 1*a* is to be removed, the conveyor 21 is operated so that the grabs 23 engage its leading bar 10 as shown in FIG. 7. This action pulls the bad screen 1*a* up over the drum 24 onto the upper stretch 26 of the conveyor 21 while advancing the replacement screen 1*b* around over the drum 25 to the lower stretch as shown in FIG. 8, where it is supported on the guide rack 29. As shown in FIG. 9 the removed screen 1*a* is on the table 28 in the position formerly occupied by the replacement screen 1*a*. The grabs 23 are backed up a little to free them from the bar 10 so that the replacement screen 1*b* can be transferred to the grabs 17 of the conveyor 16 which will pull it up and hand it off to the conveyor 18.

This operation takes three to four times as long as the time it would normally take a single screen 1 to pass the mat former 43, but does not require the operation to be shut down altogether. As soon as the change is complete, the pressing installation can continue to operate at its normal speed and a worker can roll up the damaged screen 1*a* and transport it away with a crane 30, then set a fresh screen 1*b* in position on the table 28 so it is ready when the next screen change needs to be done. A barrier or fence 41 (FIG. 5) is provided to prevent workers from getting too close to the conveyor 6 in the region of the changer 12. The changing is all done above ground but in an area that is normally not used, so the changer 12 does not add to the size of the panel-making system and can be retrofitted to existing systems.

Figure 11:
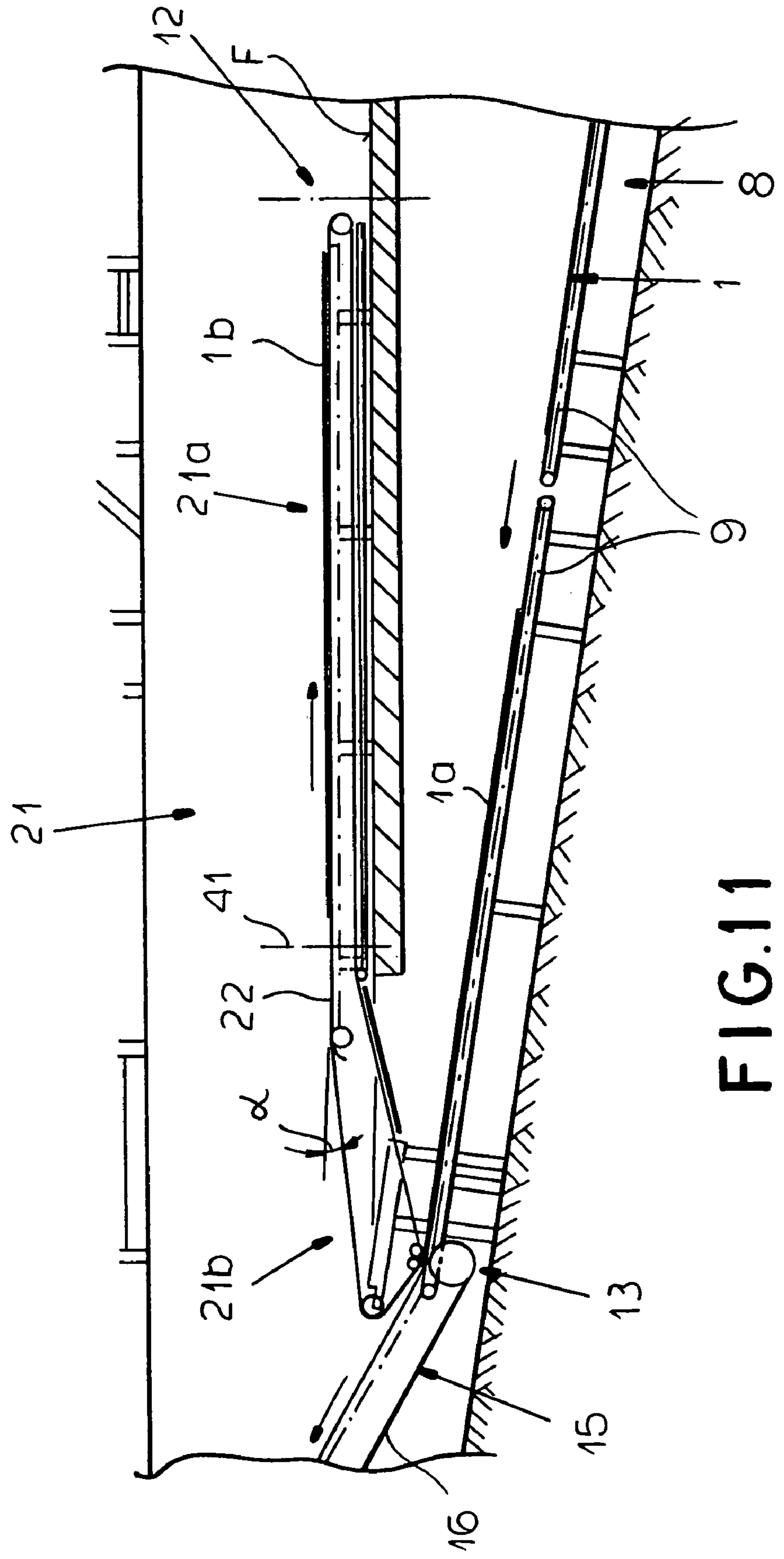
FIG. 11 is a view like FIG. 5 of another screen changer according to the invention.

In the system of FIG. 11 the conveyor 21 has a horizontal main region 21*a* and a downwardly extending end region 21*b* extending at a small acute angle a to the region 21*a* so that the important region 21*a* where all the work is done can be elevated to a convenient height. Here the barrier 41 can be further offset from the dangerous area of the conveyor 6 to where the regions 21*a* and 21*b* meet.

Figure 12:
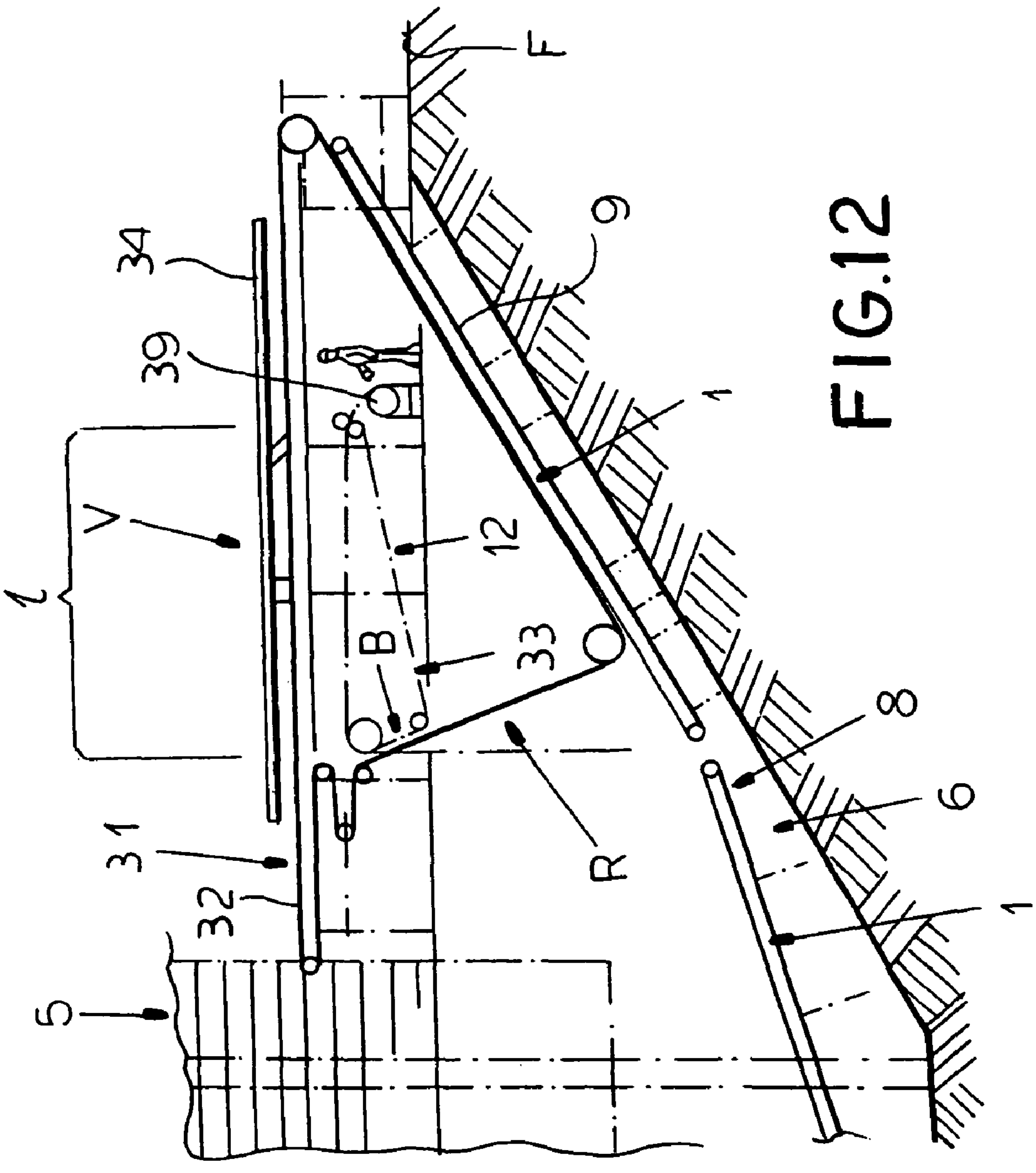
FIGS. 12 and 13 are side views of yet another screen changer in accordance with the invention.
Figure 13:
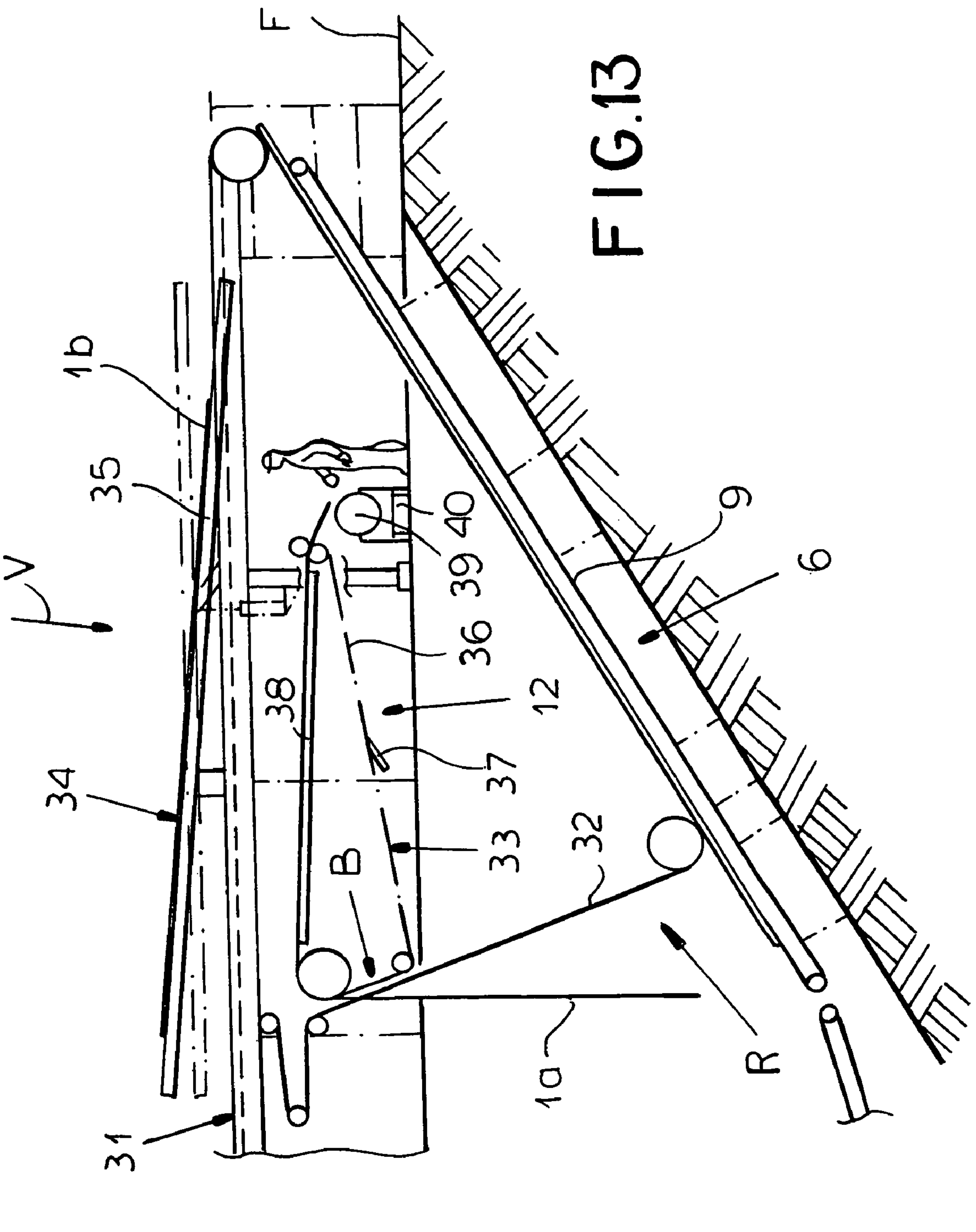

The system of FIGS. 12 and 13 shows a system where a unit 33 responsible-for removing a bad screen 1*a* from circulation is separated from a unit 34 that puts a good screen 1*b* into circulation in its place. This screen-removing unit 33 lies within the path of the conveyor 6 and the replenishing unit 34 here is positioned outside this path, above the upper stretch 7 downstream of the press unloader 5.

Here the stripper 31 has chains 32 with unillustrated grabs and serving to separate pressed panels from their screens 1, so that the screens 1 can return over the return stretch 8 to the upstream end of upper stretch 7 of the system. The stripper chains 32 follow a triangular path and a lower side of the triangle runs along one of the conveyors 9 of the return stretch 8. It functions by pulling the screens 1 down and around the downstream end of the upstream stretch 7, so that the stiff panels inherently continue to move horizontally straight downstream.

The replenishing device 34 is at an upstream portion V of the stripper 31 while the removing conveyor 33 is in a downstream portion R thereof, in fact being integrated into the conveyor 6. Both units 33 and 34 are above the floor level F and here the unillustrated mat former 43 is not set in a steel frame, but sits directly on the floor. The replenishing unit 34 comprises a pneumatically tiltable table 35 while the removing unit 33 is a chain conveyor with endless chains 36 and grabs 37 that can attach to the leading bar 10 of a screen 1 to be removed and pull it off the return stretch 8.

Here a fresh screen 1*b* is laid out manually on the table 35. To insert it into the passing row of screens 1, the table 35 is pneumatically tipped down so it slides off, catching on the conveyor 6 and being pulled to the downstream end then around and down in the return stretch.

The screen 1*a* to be stripped out is simply engaged by the grabs 37 of the stripper 31 so it can be pulled from the conveyor 9 and moved onto the removing conveyor 33 that has chains 36 with grabs 38 that can pull it onto a horizontal upper stretch 38 that is of a length 1 much shorter than the length S of the screen 1*a*. Pulling the screen 1*a* off the conveyor 9 is possible by, for example, advancing the conveyor 32 slightly faster than the conveyor 9 so that its unillustrated grabs engage and entrain the screen 1*a*. This screen 1*a* can then be wound up on a drum 39 and rolled off on a dolly 40. The advantage of this system is that the damaged screen 1*a* can be gotten out of the way by one worker while another worker positions a good screen 1*b* on the replenishment table 35.

I claim:

1. In combination:

a plurality of separate screens including a bad screen;

conveyor means for displacing the screens in a row along a closed annular path having a generally horizontal upper stretch and a lower return stretch spaced below the upper stretch;

means for forming particle mats on the screens on the upper stretch;

pressing means along the upper stretch downstream of the mat-forming means for pressing the mats into rigid panels on the respective screens;

stripper means along the upper stretch downstream of the pressing means for separating the panels from the respective screens, whereby the screens are all empty in the lower return stretch; and screen changing means including a unit for removing the bad screen from the conveyor and a unit for feeding a single fresh screen to the conveyor and thereby replacing the bad screen with the fresh screen, one of the units being generally entirely within the path, below the upper stretch and above the lower stretch.

2. The combination defined in claim 1 wherein both of the units are located within the path along the lower return stretch near an upstream end of the upper stretch.

3. The combination defined in claim 2 wherein the conveyor means includes at the downstream end of the return stretch an upwardly angled conveyor having a pair of horizontally spaced conveyor elements carrying grabs engageable with the screens, the removing unit pulling the bad screen off the conveyor upstream of the angled conveyor and the feeding unit feeding the fresh screen to the angled conveyor.

4. The combination defined in claim 1 wherein the changer means is juxtaposed with the stripper means.

5. The combination defined in claim 1 wherein the removing unit is located inside the path.

6. The combination defined in claim 5 wherein both the units are inside the path, the changing means including a single conveyor that simultaneously pulls the bad screen from the conveyor and feeds the fresh screen to it.

7. The combination defined in claim 6 wherein the single conveyor has a pair of flexible endless conveyor elements each provided with a succession of grabs engageable with the screens.

8. The combination defined in claim 6 wherein the single conveyor has a horizontal stretch.

9. The combination defined in claim 8 wherein the single conveyor has an end stretch extending at an angle to the horizontal stretch from the horizontal stretch to the return stretch of the conveyor means.

10. The combination defined in claim 8 wherein the single conveyor has an upper stretch and a table immediately underneath it and a lower stretch and a guide immediately underneath it.

11. The combination defined in claim 6 wherein the single conveyor is at least as long as one of the screens.

12. The combination defined in claim 1 wherein the other of the units is outside the path.

13. The combination defined in claim 12 wherein the feeding unit is outside the path and the removing units is inside the path.

14. The combination defined in claim 13 wherein the feeding unit is upstream of the removing unit.

15. The combination defined in claim 13 wherein the feeding unit includes a tippable table above the upper stretch downstream of the press means.

16. The combination defined in claim 13 wherein the removing unit includes a pair of endless conveyor elements provided with grabs engageable with the screens.

17. In combination:

a plurality of separate screens including a bad screen;

conveyor means for displacing the screens in a row along a closed annular path having a generally horizontal upper stretch and a lower return stretch spaced below the upper stretch;

means for forming particle mats on the screens on the upper stretch;

pressing means along the upper stretch downstream of the mat-forming means for pressing the mats into rigid panels on the respective screens;

stripper means along the upper stretch downstream of the pressing means for separating the panels from the respective screens, whereby the screens are all empty in the lower return stretch; and screen changing means including a unit for removing the bad screen from the conveyor and a unit for feeding a single fresh screen to the conveyor and thereby replacing the bad screen with the fresh screen, both of the units being generally entirely within the path, below the upper stretch and above the lower stretch.

18. In combination:

a plurality of separate screens including a bad screen;

conveyor means for displacing the screens in a row along a closed annular path having a generally horizontal upper stretch and a lower return stretch spaced below the upper stretch;

means for forming particle mats on the screens on the upper stretch;

pressing means along the upper stretch downstream of the mat-forming means for pressing the mats into rigid panels on the respective screens;

stripper means along the upper stretch downstream of the pressing means for separating the panels from the respective screens, whereby the screens are all empty in the lower return stretch; and screen changing means including a unit for removing the bad screen from the conveyor and a unit for feeding a single fresh screen to the conveyor and thereby replacing the bad screen with the fresh screen, the removing unit being generally entirely within the path, below the upper stretch and above the lower stretch, the feeding unit being above the upper stretch downstream of the stripper means.

* * * * *